(12) United States Patent
Rhoades et al.

(10) Patent No.: US 11,677,183 B2
(45) Date of Patent: Jun. 13, 2023

(54) POWER TRANSFER SYSTEM

(71) Applicant: NIFCO AMERICA CORP., Canal Winchester, OH (US)

(72) Inventors: William Russell Rhoades, Columbus, OH (US); Kelly Paige Miller, Dublin, OH (US)

(73) Assignee: NIFCO AMERICA CORP., Canal Winchester, OH (US)

(*) Notice: Subject to any disclaimer, the term of this patent is extended or adjusted under 35 U.S.C. 154(b) by 65 days.

(21) Appl. No.: 17/336,698

(22) Filed: Jun. 2, 2021

(65) Prior Publication Data

US 2022/0393397 A1 Dec. 8, 2022

(51) Int. Cl.
*H01R 13/627* (2006.01)
*H01R 13/74* (2006.01)
*B60R 16/03* (2006.01)

(52) U.S. Cl.
CPC ......... *H01R 13/6273* (2013.01); *B60R 16/03* (2013.01); *H01R 13/74* (2013.01); *H01R 2201/26* (2013.01)

(58) Field of Classification Search
CPC ............ H01R 13/6275; H01R 13/6273; H01R 13/74; H01R 2201/26; B60R 16/03
USPC .................................. 439/357, 358, 261, 34
See application file for complete search history.

(56) References Cited

U.S. PATENT DOCUMENTS

| | | | | | |
|---|---|---|---|---|---|
| 2,388,650 | A | * | 11/1945 | Whittell | H01R 33/975 248/500 |
| 3,101,230 | A | * | 8/1963 | Bausch | H05K 7/1405 248/500 |
| 4,941,838 | A | * | 7/1990 | Zinn | H01R 13/639 439/352 |
| 6,135,778 | A | * | 10/2000 | Ubelein | B60J 5/0416 439/34 |
| 2001/0023145 | A1 | * | 9/2001 | Mito | H01R 13/6273 439/357 |
| 2006/0105617 | A1 | * | 5/2006 | Padro | H01R 13/6275 439/484 |

* cited by examiner

*Primary Examiner* — Gary F Paumen
(74) *Attorney, Agent, or Firm* — Manabu Kanesaka

(57) ABSTRACT

A power transfer system includes a port panel assembly including a port panel, a locating pocket formed in the port panel, locking ports arranged in the locating pocket, and terminal assemblies attached to a rear side of the locating pocket and having conductive terminals, and a power transfer assembly having a transfer housing with access ports and terminal retainers, latches housed in the transfer housing to engage the locking ports, a spring arranged between the latches and pressing the latches to protrude outwardly from the transfer housing through the access ports, and connection members arranged in the terminal retainer and adapted be connected to an electric device. When the power transfer assembly is inserted into the port panel assembly, tip portions of the latches are inserted into the locking ports to be secured to the port panel assembly, and the connection members contact the conductive terminals of the port panel.

9 Claims, 21 Drawing Sheets

POWER TRANSFER SYSTEM

FIELD OF THE INVENTION

The present invention relates to a power transfer system for internal use within a vehicle. More specifically, the invention relates to component features (such as cup holders, phone holders, USB ports, container, etc.) with a self-contained housing that requires an electrical power, supplied from an electrical power system of the vehicle, to be operated. These self-contained housings allow the component features to be connected to power supply ports throughout an interior of the vehicle. These self-contained housing can then be moved from one power supply port to another supply port to configure and customize their cabin areas.

BACKGROUND OF THE INVENTION

Generally, vehicle manufacturers accommodate all component features that a passenger wants and needs, requiring an electrical power. However, a large number of component feature variations is not available to accommodate all component features because the number of component features powered within the vehicle is limited.

Manufacturers usually permanently mold a few power locations to accommodate all component features into an interior of the vehicle. However, adding and removing these component features to and from one power location allows passengers to arrange the cabin layout based on their own wants and needs.

Accordingly, an object of the invention is to provide a power transfer system for component features or components requiring the electrical power and installed within the interior of a vehicle structure, wherein the component variations are available and the arrangement of the cabin layout is allowed.

SUMMARY OF THE INVENTION

The power transfer system allows component features or devices requiring an electrical power from an electrical power system of the vehicle to be quickly installed, removed and relocated throughout a structure of a vehicles interior.

The power transfer system of the invention basically comprises a port panel assembly including a port panel, a locating pocket formed in the port panel, locking ports arranged in the locating pocket, and terminal assemblies attached to a rear side of the locating pocket and having conductive terminals; and a power transfer assembly having a transfer housing with access ports and terminal retainers, latches housed in the transfer housing to engage the locking ports, a spring arranged between the latches and pressing the latches to protrude outwardly from the transfer housing through the access ports, and connection members arranged in the terminal retainer and adapted be connected to an electric device. When the power transfer assembly is inserted into the port panel assembly, tip portions of the latches are inserted into the locking ports to be secured to the port panel assembly, and the connection members contact the conductive terminals of the port panel.

Accordingly, in the first aspect of the power transfer assembly, an internal latching mechanism is utilized for installing and removing the component feature or devices on and from the port panel throughout the vehicles interior. Thus, when the port panel assembly is installed in a portion, such as inside the vehicle, the power transfer assembly can be easily attached to the port panel assembly.

In the present invention, the power transfer assembly further includes a release member so that when an external force is applied to the release member, the tip portions of the latches move inwardly and are released from the locking ports and the connection members move away from the conductive terminal. Therefore, the power transfer assembly can be easily removed from the panel assembly.

In the invention, the port panel assembly further includes an elastic member arranged between the terminal assemblies to rotate the terminal assemblies in one direction so that when the power transfer assembly is inserted into the port panel assembly, the terminal assemblies are rotated to contact the conductive terminals with the connection members.

In this respect, each of the terminal assemblies has a pivot arm for rotation, and one of the conductive terminals so that when the terminal assembly is rotated, the one conductive terminal is located in the terminal retainer to contact one of the connection members. Also, it is possible to provide a consistent pressure between the power terminals of the port panel and the electric device to ensure a steady un-interrupted source of power.

BRIEF DESCRIPTION OF THE DRAWINGS

The disclosure will be more understood by referring the following descriptions in conjunction with the drawings.

DETAILED DESCRIPTION OF THE INVENTION

The following description is exemplary in nature and is not intended to limit a described embodiment and uses. Furthermore, there is no intention to be bound by any theory presented by the following description.

Figure 1:
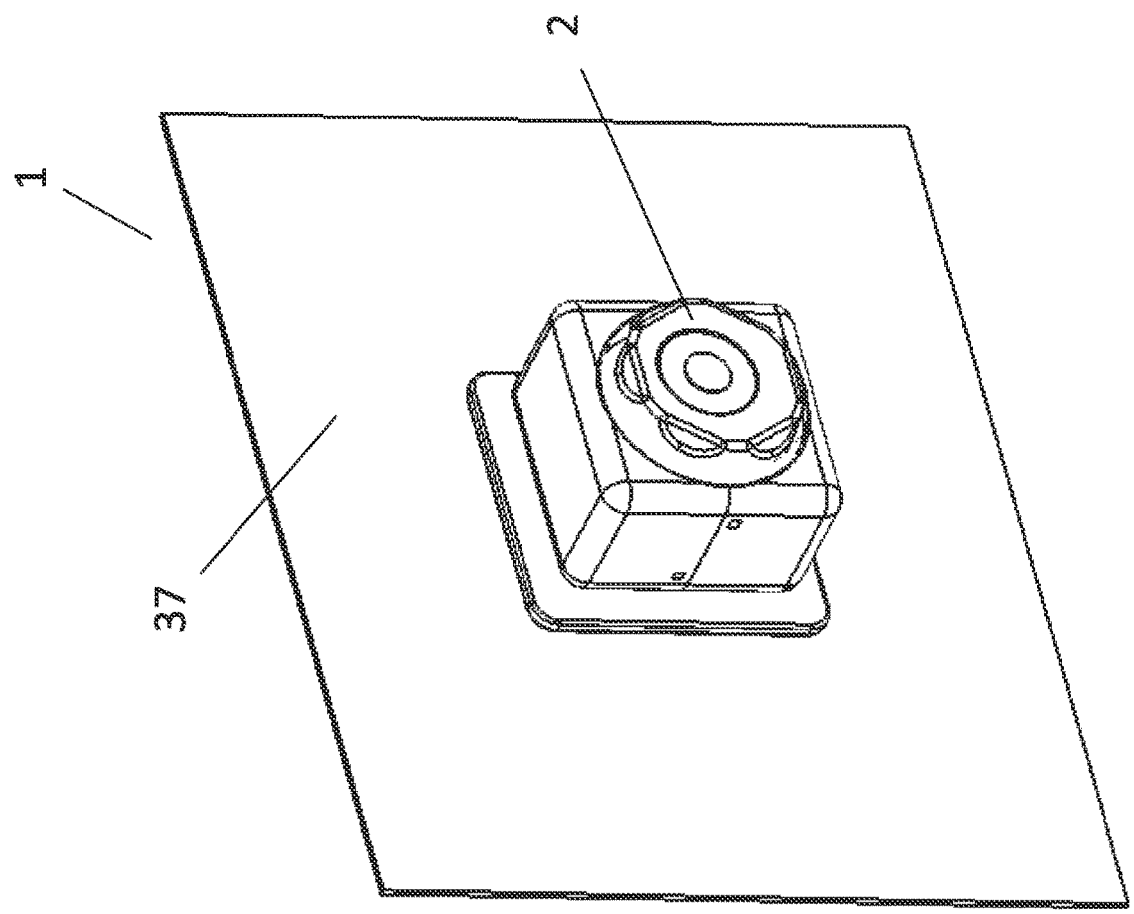
FIG. 1 shows a front view of the power transfer system according to the disclosure.
Figure 2:
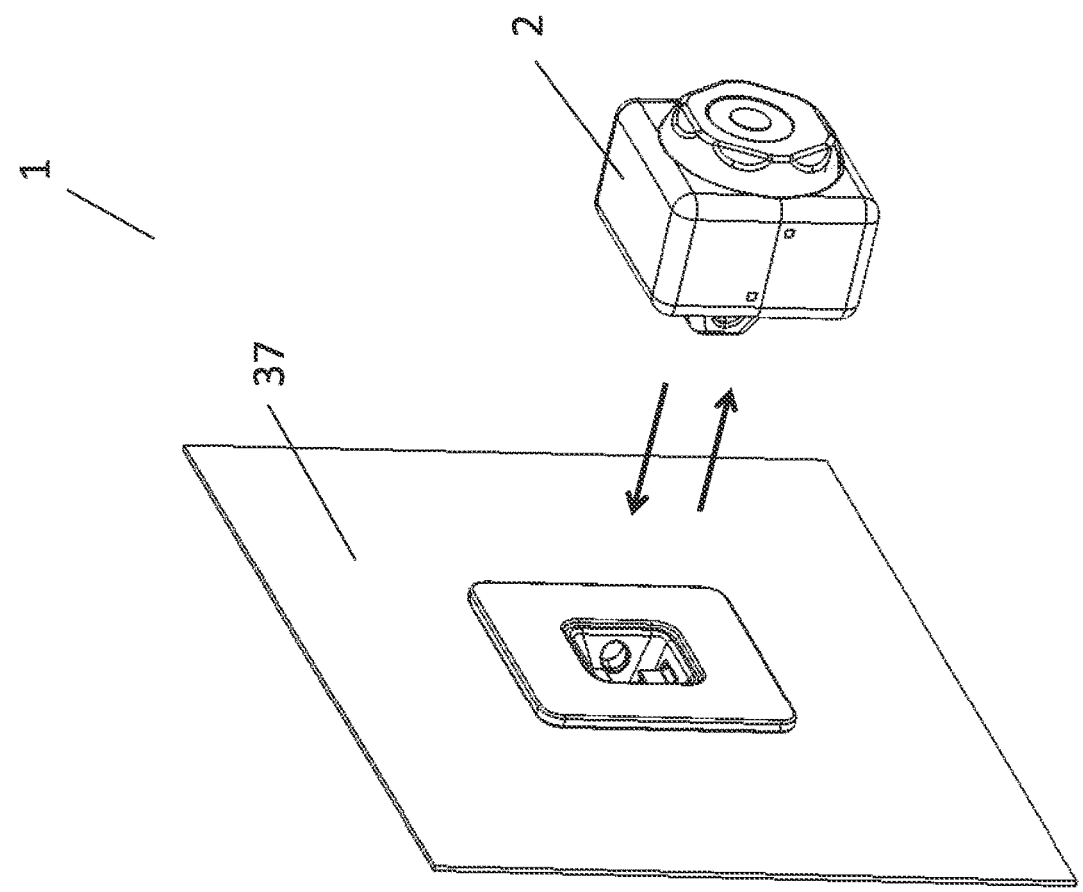
FIG. 2 shows an exploded view of the power transfer system according to the disclosure.

FIG. 1 and FIG. 2 each shows a power transfer system 1 including a component feature 2 (in this embodiment, a wireless baby monitor) and a vehicle panel assembly 37. The vehicle panel assembly 37 is mounted on an interior panel of a vehicle. The component feature 2 can then be installed into and removed from the vehicle panel assembly 37.

Figure 3:
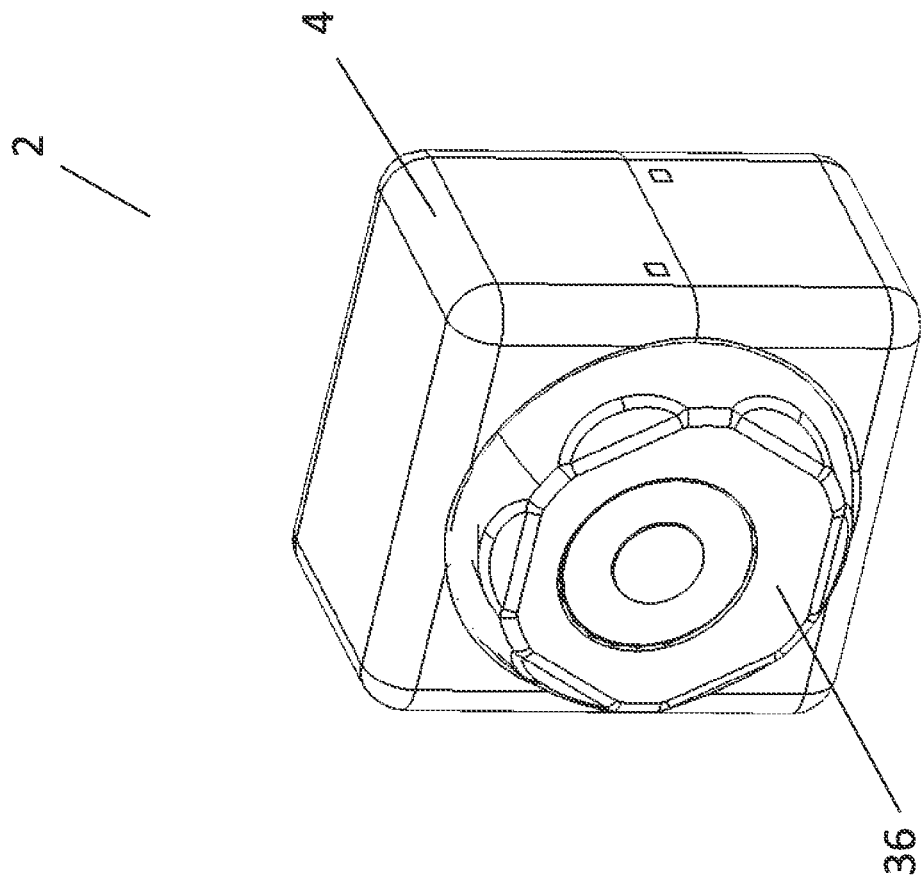
FIG. 3 shows a front view of the component according to the invention.
Figure 4:
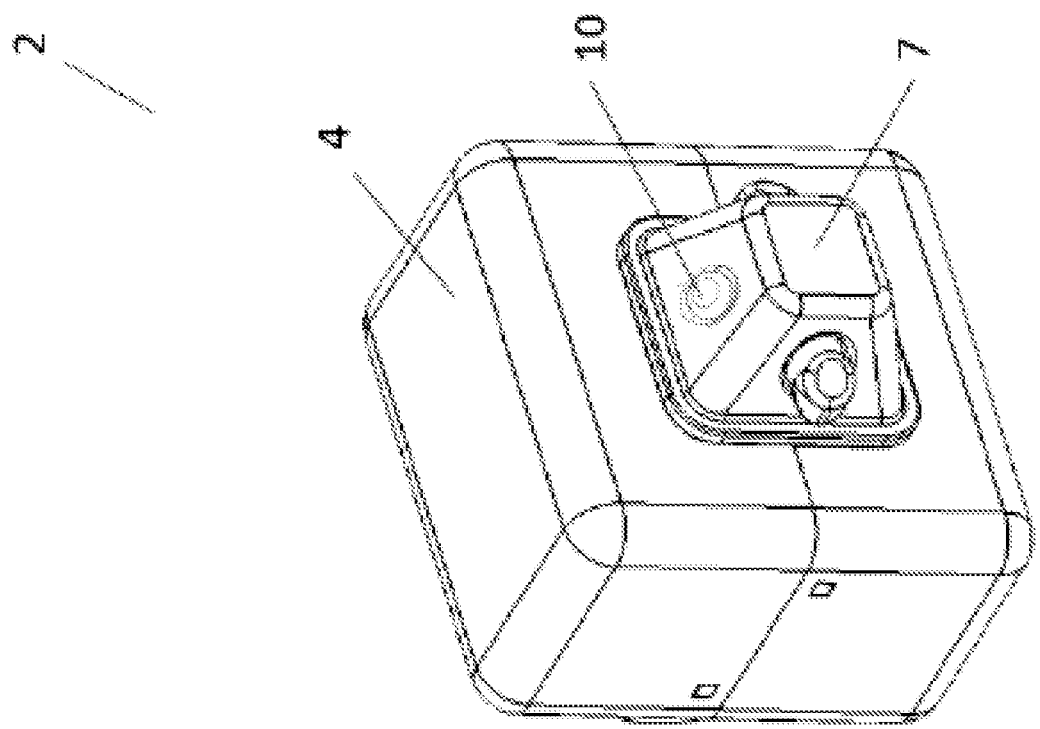
FIG. 4, shows a rear view of the component according to the invention.

FIG. 3 and FIG. 4 each shows the component feature 2 including a self-contained housing 4, a camera assembly 36, and a power transfer assembly 7. The component feature 2 substantially has a rectangular parallelepiped shape, and the self-contained housing 4 is formed with two halves designed as a claim shell. The camera assembly 36 and the power transfer assembly 7 are retained between the two halves of the self-contained housing 4. The camera assembly 36 is an electric device and is located at a front side of the self-contained housing 4 and the power transfer assembly 7 is located at a rear side of the self-contained housing 4.

Figure 5:
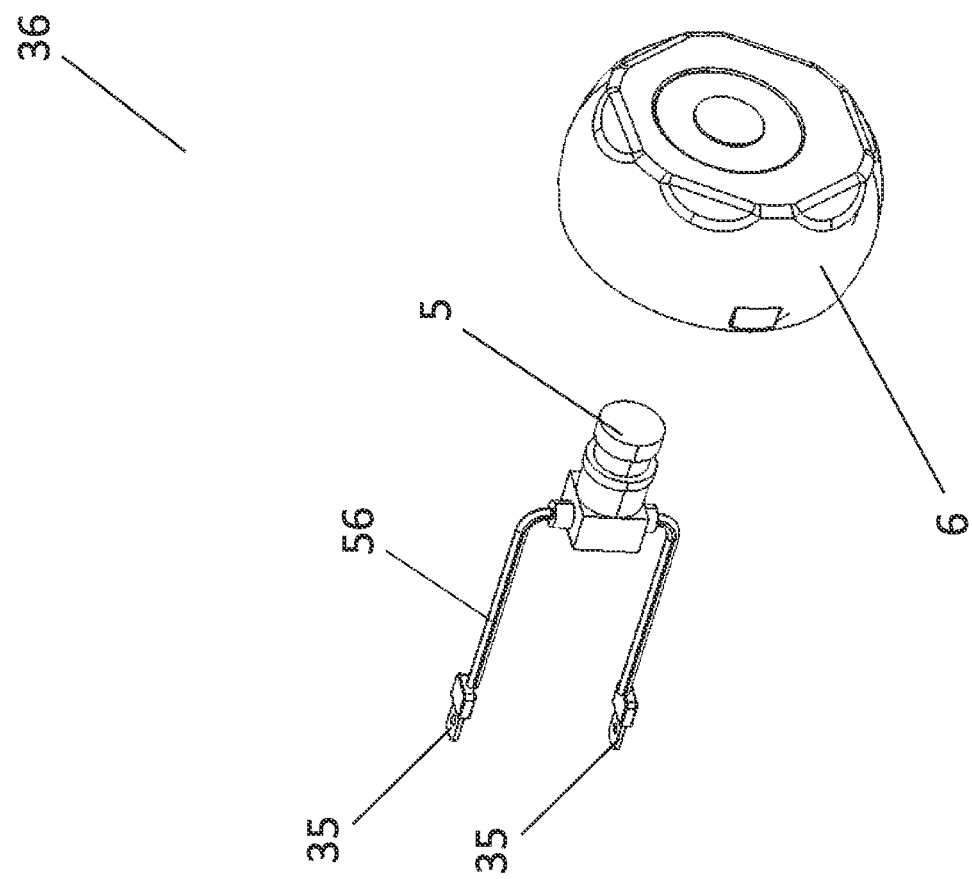
FIG. 5 shows an exploded view of the camera assembly according to the invention.

FIG. 5 shows a camera assembly 36 including a camera housing 6, a wireless Bluetooth day/night video camera 5, connection wires 56, and wire connectors 35. The camera housing 6 substantially has a dome shape with a space, and the wireless Bluetooth day/night video camera 5 is clipped at a back side of the camera housing 6 in the space of the camera housing 6. The connection wires 56 extend outward from the wireless Bluetooth day/night video camera 5 to form C shape, and the wire connectors 35 are located at outer ends of the connection wires 56.

Figure 6:
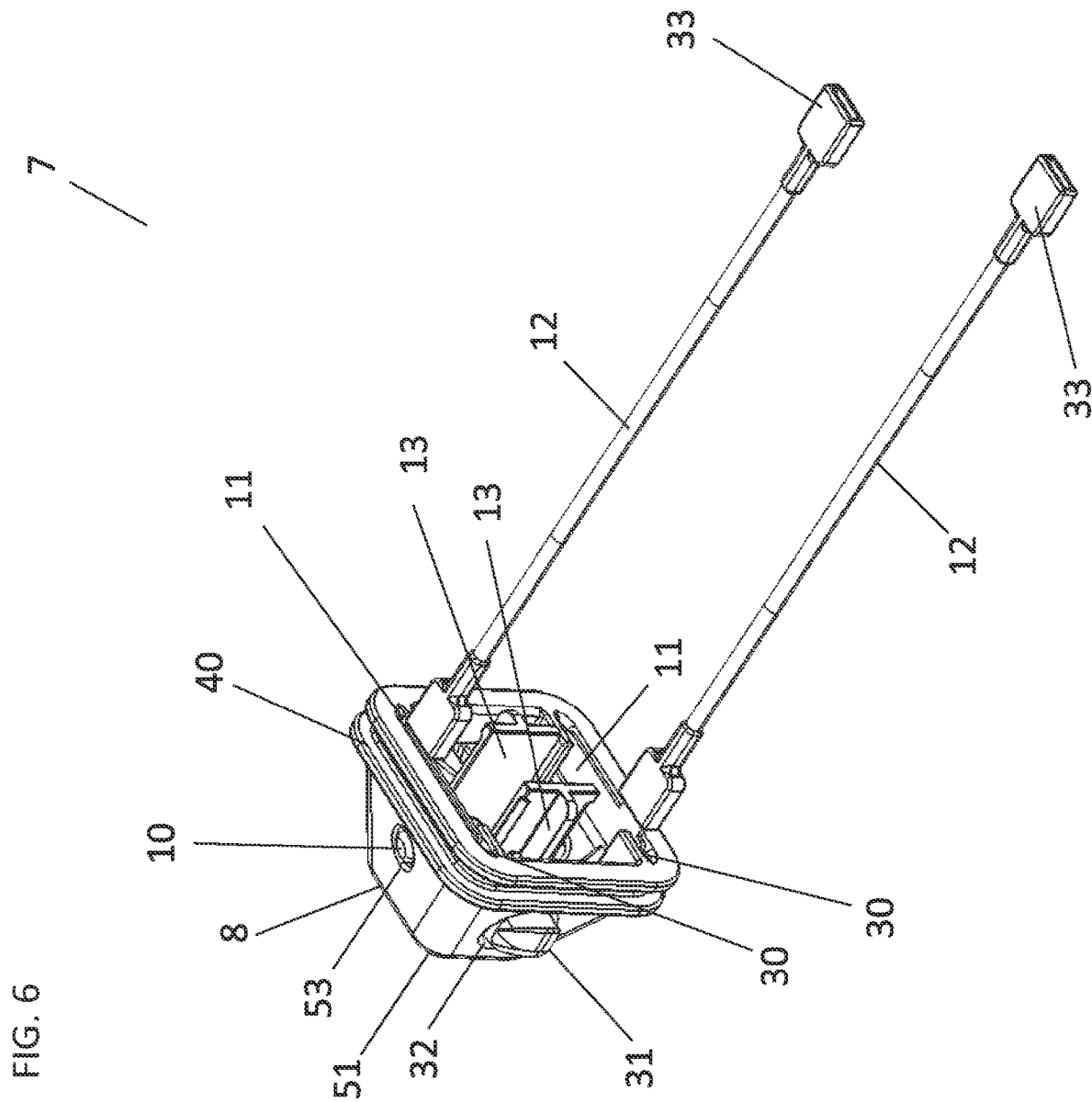
FIG. 6 shows a rear view of the power transfer assembly according to the invention.
Figure 7:
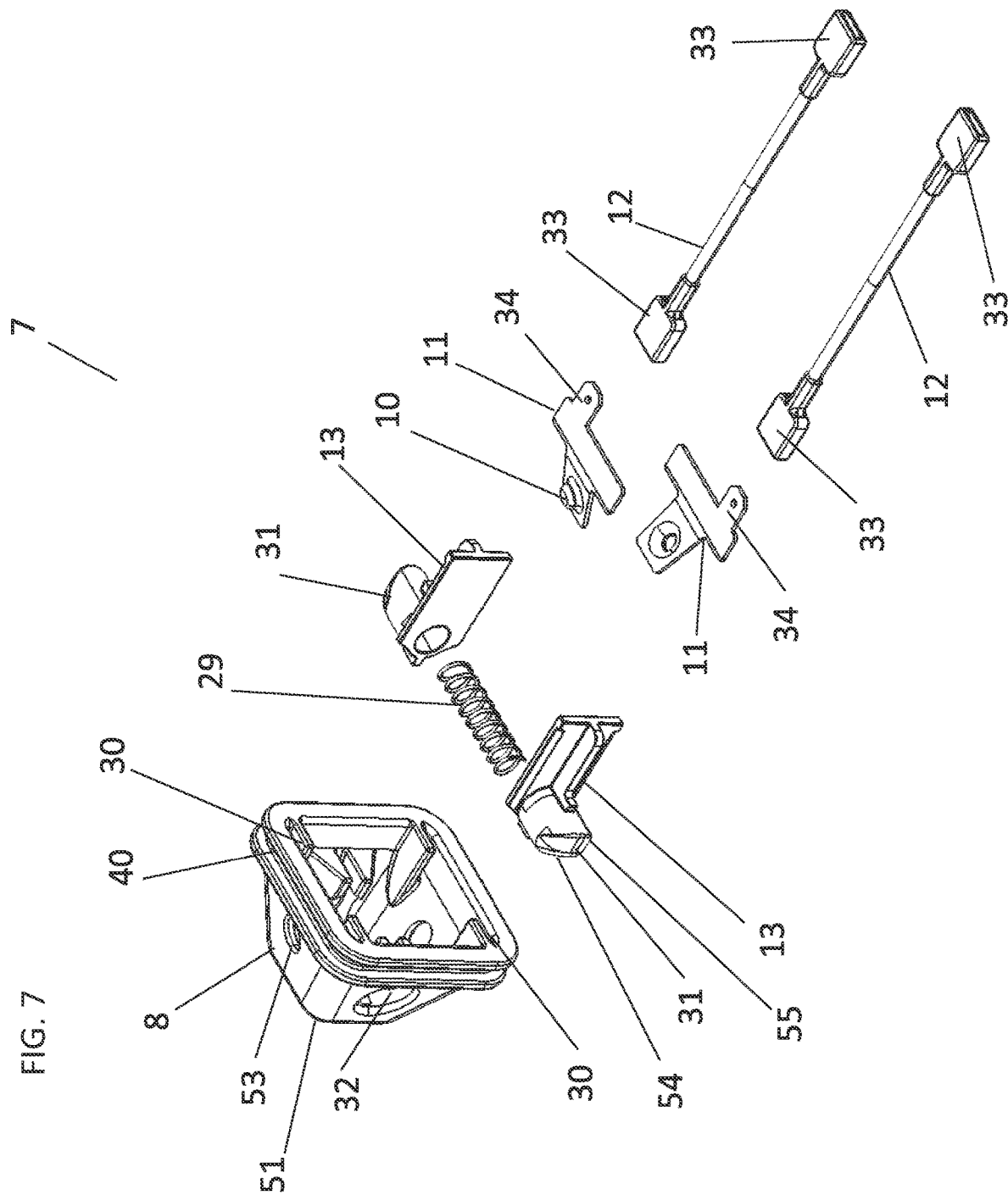
FIG. 7 shows an exploded rear view of the power transfer assembly according to the invention.

FIG. 6 and FIG. 7 each shows the power transfer assembly 7 including a transfer housing 8, latches 13, a compression spring 29, insert terminals 11, and component feature power supplies 12. The transfer housing 8 includes a top portion having a transfer housing surface 51 at an outer side of the top portion, side portions surrounding the top portion to form substantially a truncated square pyramid shape with a space inside the transfer housing 8, an opening communicated with the space at a bottom side of the transfer housing 8, and a flange portion 40 having a groove.

The side portions include two side portions facing each other, each having an access port 32, and another two side portions facing each other, each having a terminal retainer 53. The access port 32 and the terminal retainer 53 are through holes. The latches 13 are two latches, each having a latch tip 31 at one end portion and being inserted into the access port 32 from the space inside the transfer housing 8 to protrude the latch tip 31 from the transfer housing 8. The latch tip 31 includes a slide portion 54 at a front side of the latch tip 31 and an inclined portion 55 connected to the slide portion 54 at a rear side of the latch tip 31. The slide portion 54 is inclined to further protrude horizontally from the front side toward the rear side of the latch tip 31, and the inclined portion 55 is inclined to be narrowed from the slide portion 54 toward the rear side of the latch tip 31.

The compression spring 29 is located between the latches 13 in the space of the transfer housing 8 as its assembled position, and presses the latches 13 to move away from one another, and it causes the latch tips 31 to extend out through the access ports 32 of the transfer housing 8. With the compression spring 29, the latches 13 move into and out from the space of the transfer housing 8 when external forces are applied to the latch tips 31 during installation and removal of the component feature 2. The transfer housing 8 further includes insert pockets 30 at the opening communicated with the space of the transfer housing 8, and the insert pocket 30 is defined by a pair of protrusions protruding inward from the two side portions having the access ports 32 to form a slit.

The insert terminals 11 are two insert terminals, each including a base portion, an insert tab 34 in the base portion, an extension portion extending from the base portion, and a terminal catch 10 on the extension portion. The inset terminal 11 is pressed into the insert pocket 30 until the terminal catch 10 clips into the terminal retainer 53 of the transfer housing 8. The component feature power supplies 12 are two connection wires as power supplies, each including wire connectors 33 at both ends, and one of the wire connectors 33 is connected to the insert terminal 11 by pushing the insert tab 34 of the insert terminal 11 into the wire connector 33.

Figure 8:
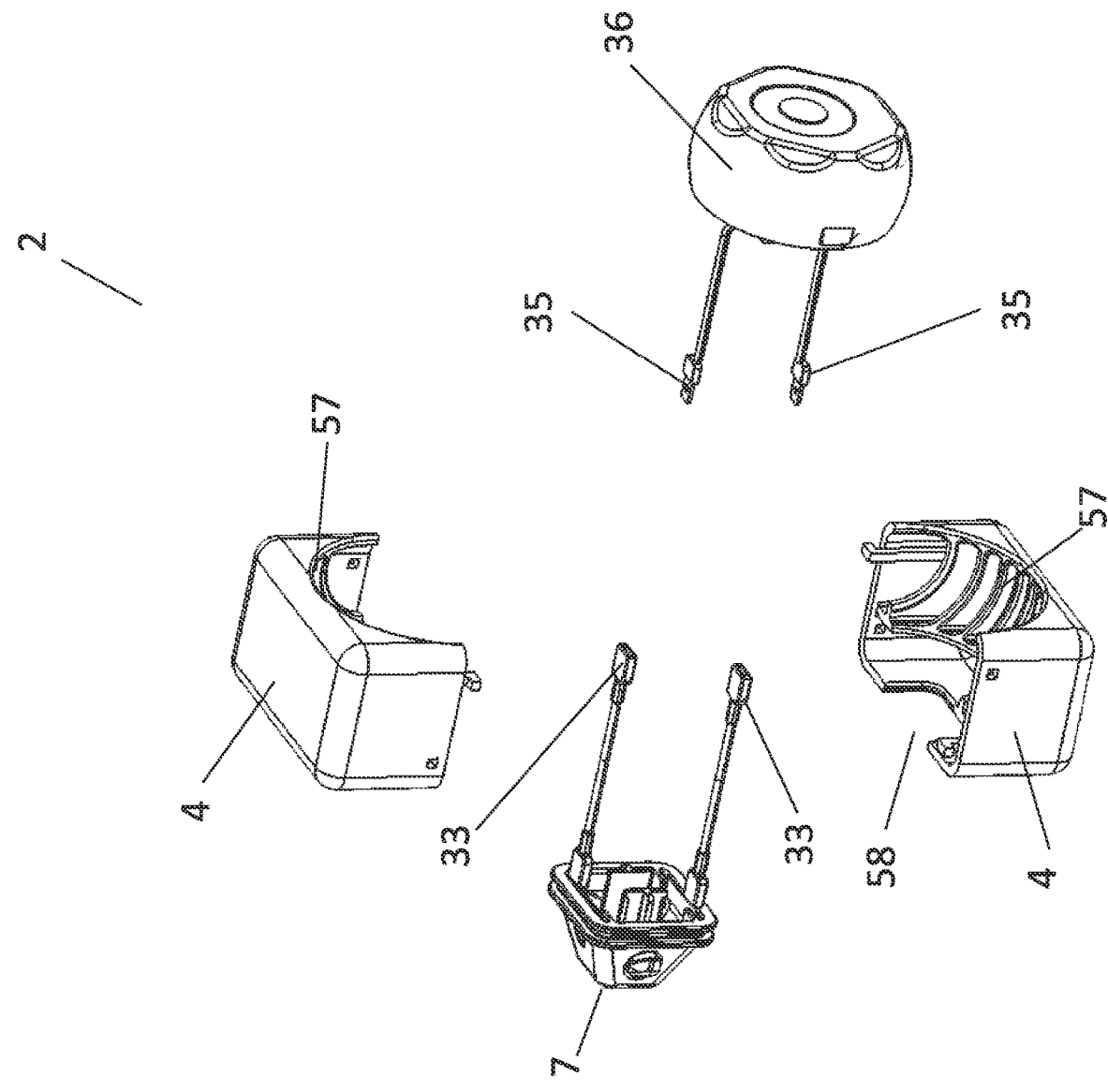
FIG. 8 shows an exploded view of the component feature according to the invention.

FIG. 8 shows an assembly process of the component feature 2. The wire connectors 33 of the power transfer assembly 7, not connecting to the inset terminal 11, are connected to the wire connectors 35 of the camera assembly 36. The two halves of the self-contained housing 4 further include supporting portions 57 at the front side of the self-contained housing 4 and openings 58 at the rear side of the self-contained housing 4. The support portions 57 each has a semicircle shape extending from one side to the other side, and includes a plurality of ribs extending from the front side to the rear side of the self-contained housing 4. The support portions 57 form a circle shape in the assembled position wherein the two halves are engaged, and the openings 58 form a rectangle in the assembled position wherein the two halves are engaged.

The power transfer assembly 7 and camera assembly 36 are placed into the self-contained housing 4 such that edges of the openings 58 at the rear side are inserted into the groove of the flange portion 40 of the transfer housing 8 and the camera assembly 36 is supported on the supporting portions 57. In the assembled position, one of the two halves of the self-contained housing 4 is then covered on the other of the two halves of the self-contained housing 4 to be snapped together.

Figure 9:
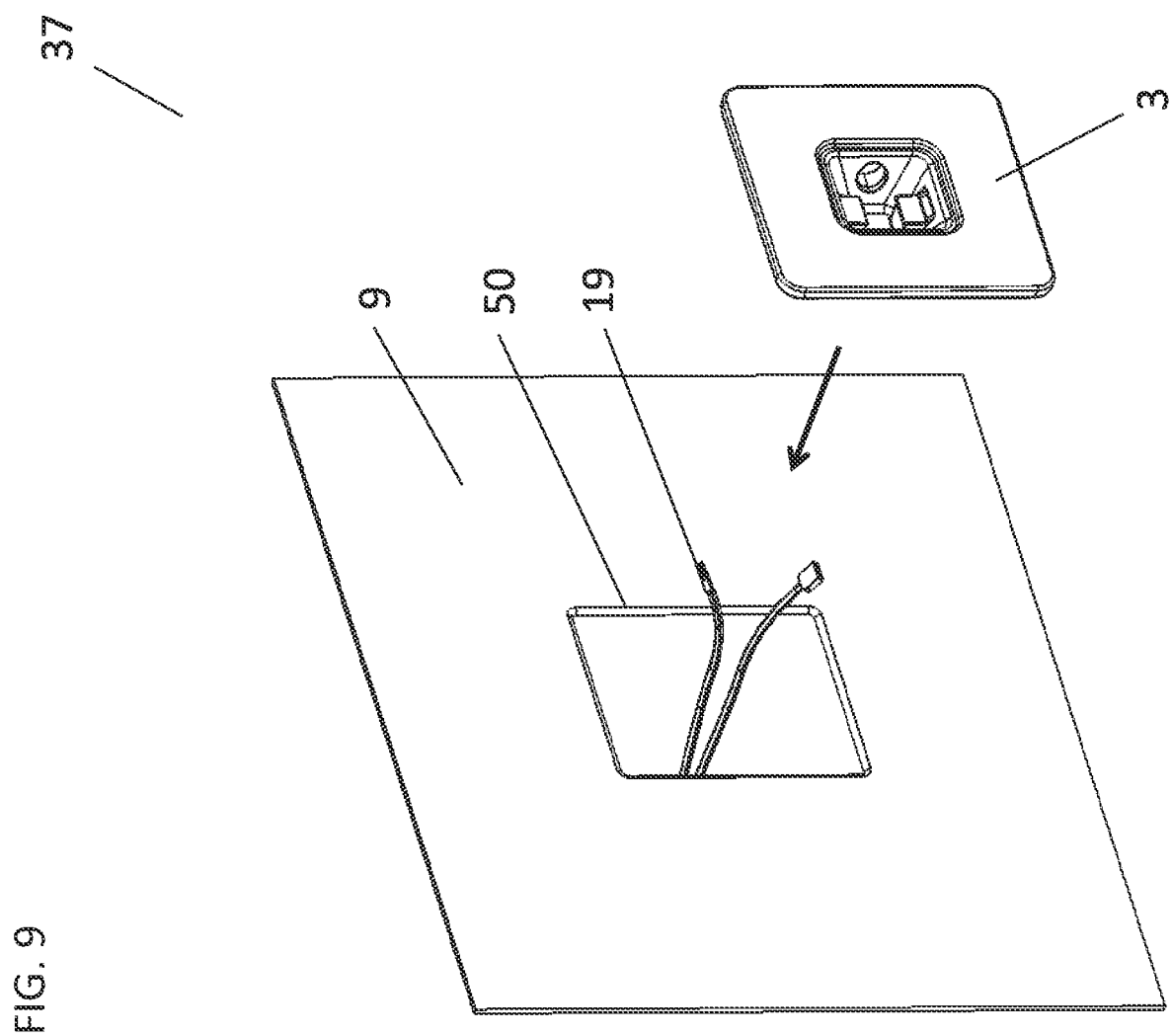
FIG. 9 shows an exploded view of the vehicle panel assembly according to the invention.
Figure 10:
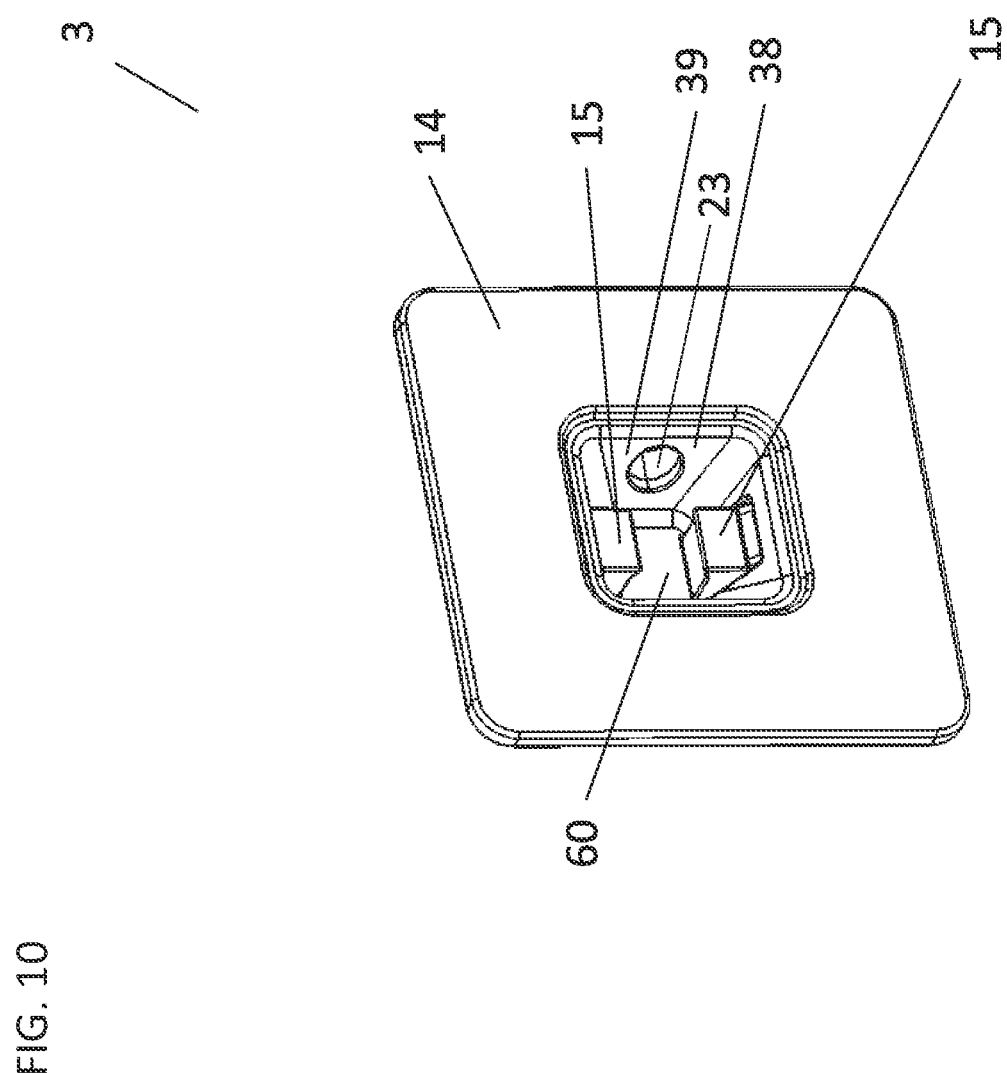
FIG. 10 shows a front view of the port panel assembly according to the invention.
Figure 11:
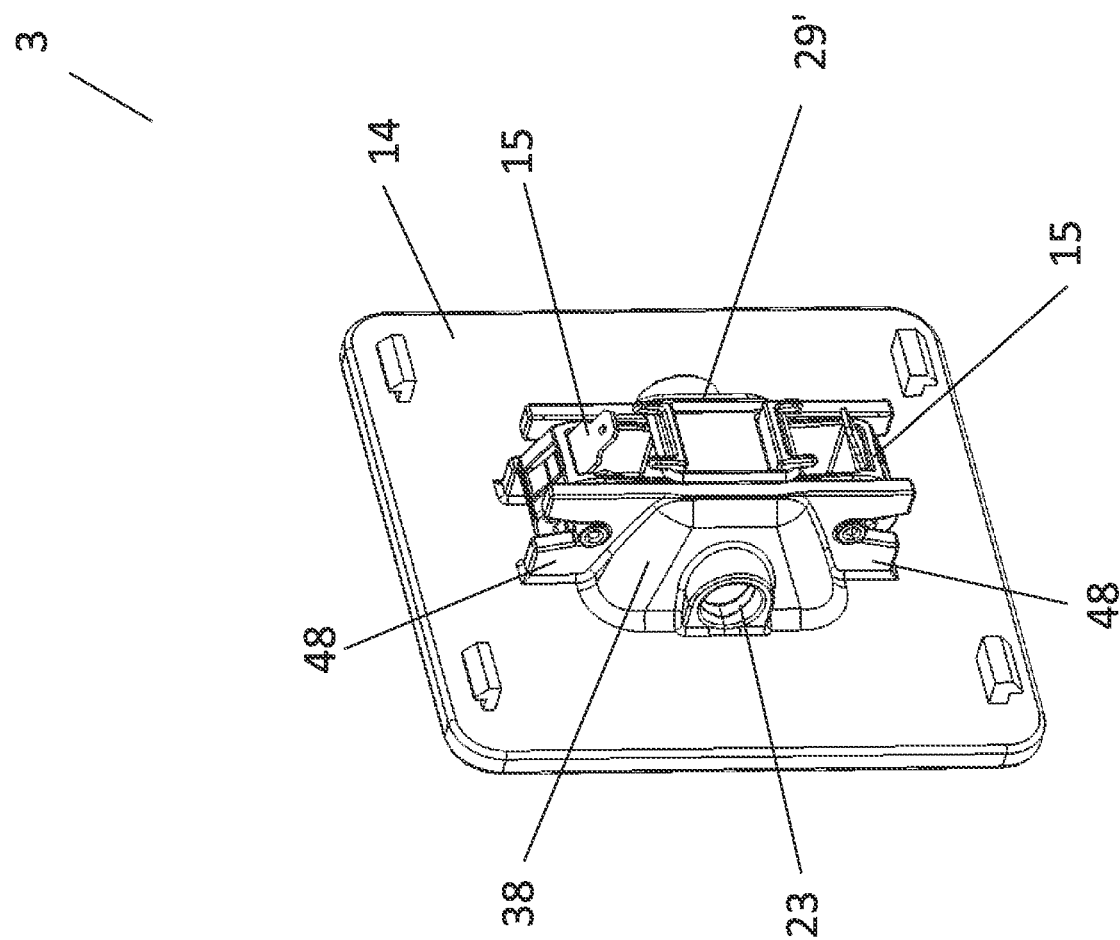
FIG. 11 shows a rear view of the port panel assembly according to the invention.
Figure 12:
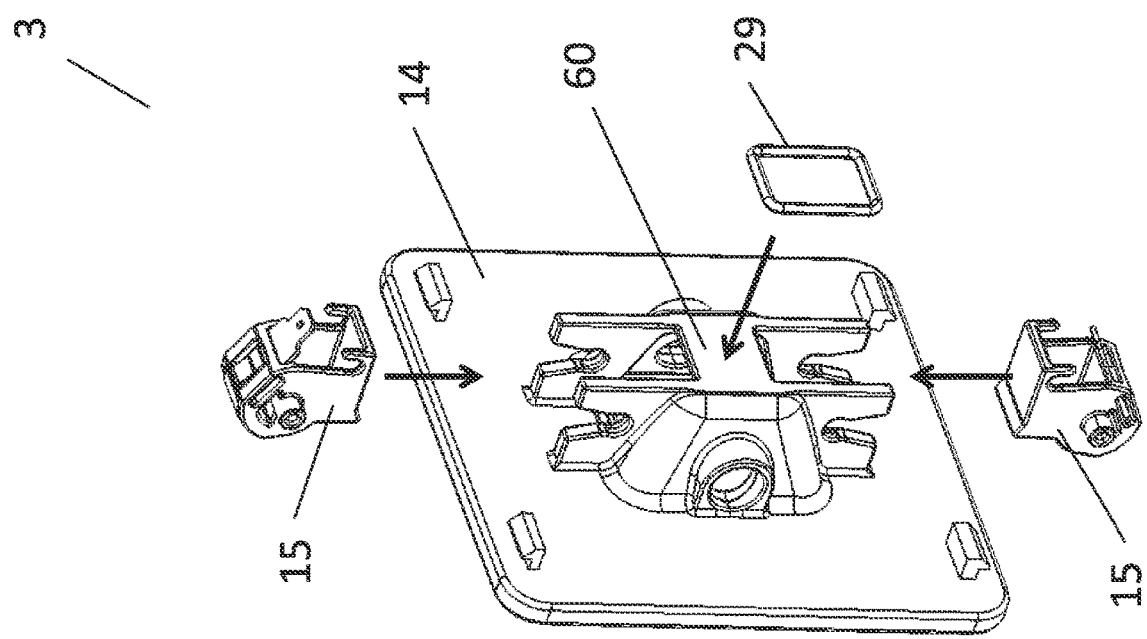
FIG. 12 shows an exploded view of the port panel assembly according to the invention.
Figure 13:
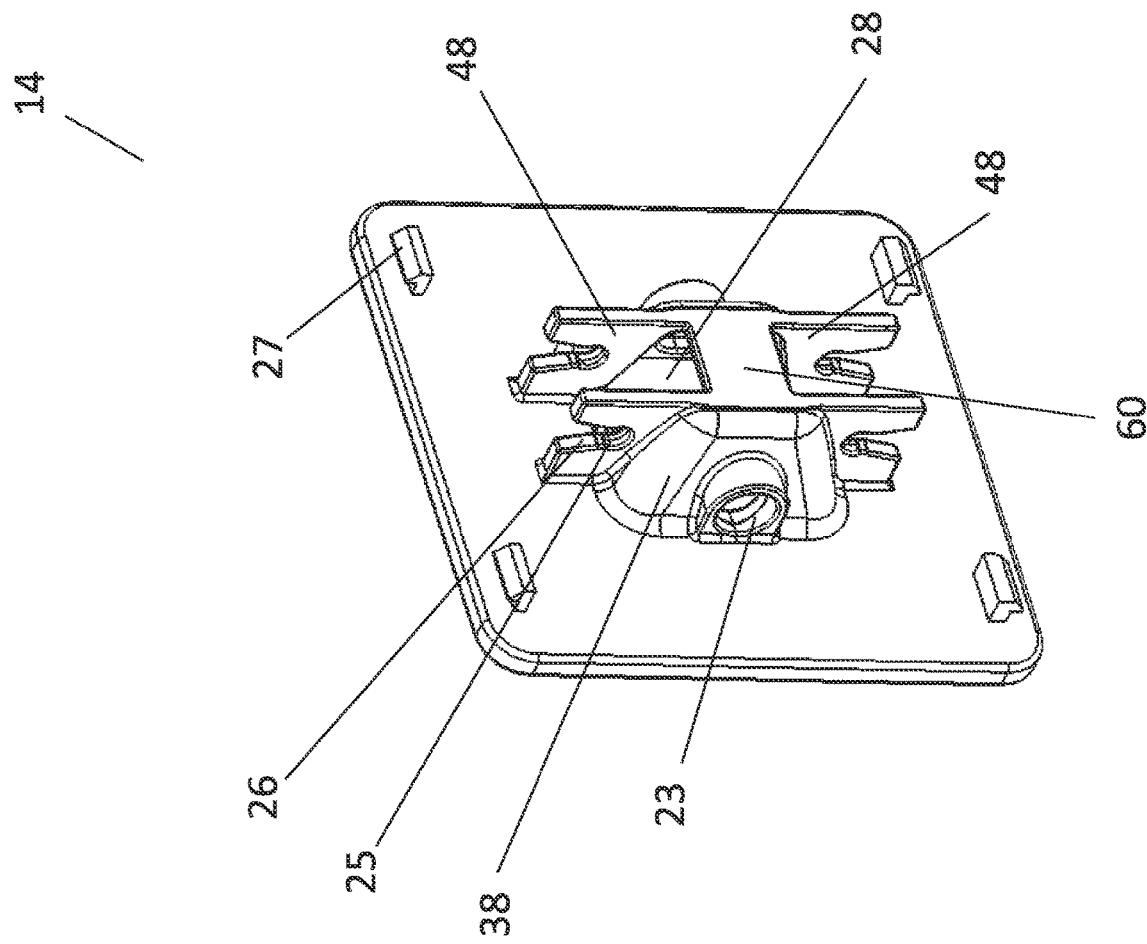
FIG. 13 shows a rear view of the port panel according to the invention.
Figure 14:
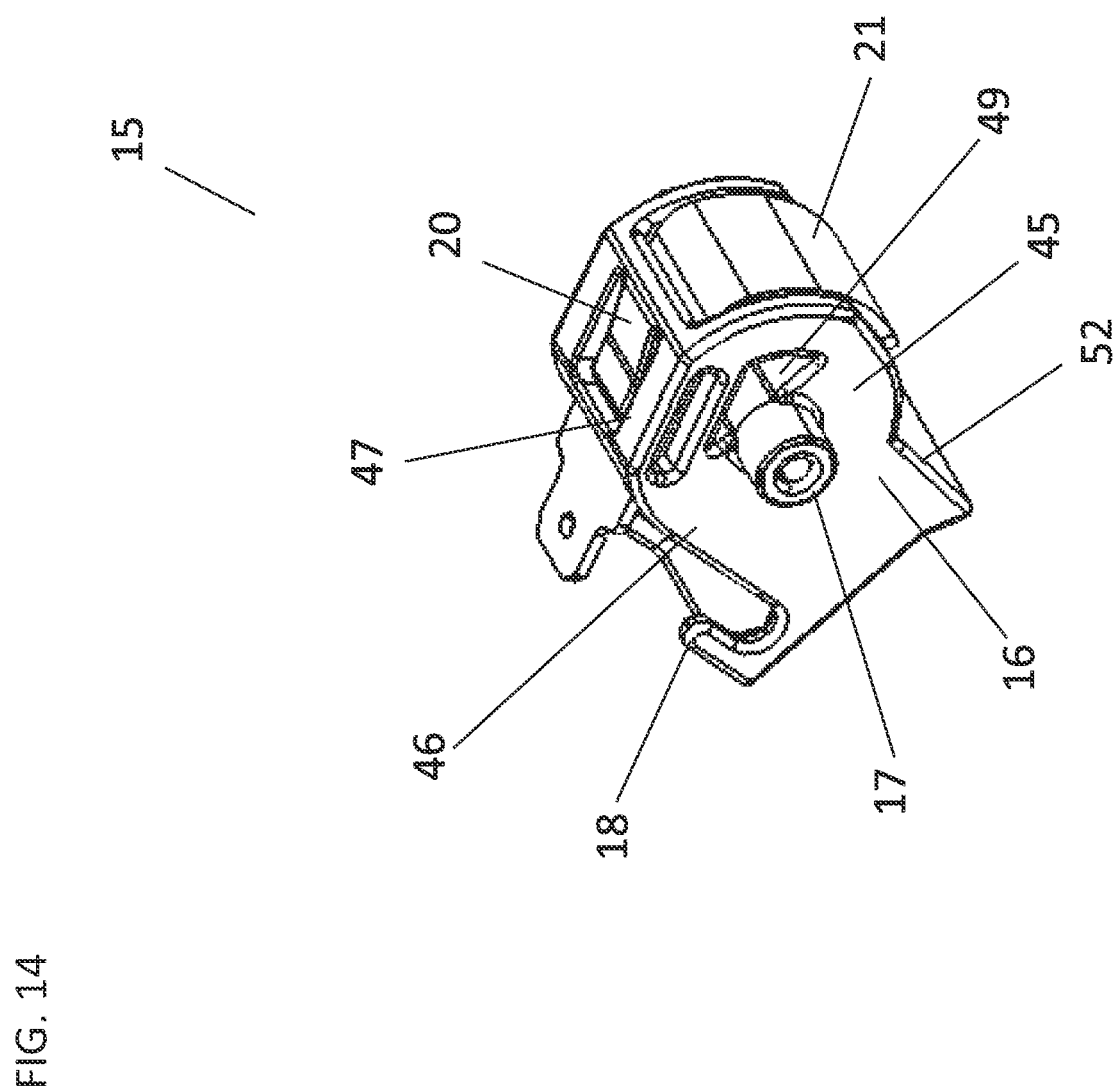
FIG. 14 shows a front view of the terminal assembly according to the invention.
Figure 15:
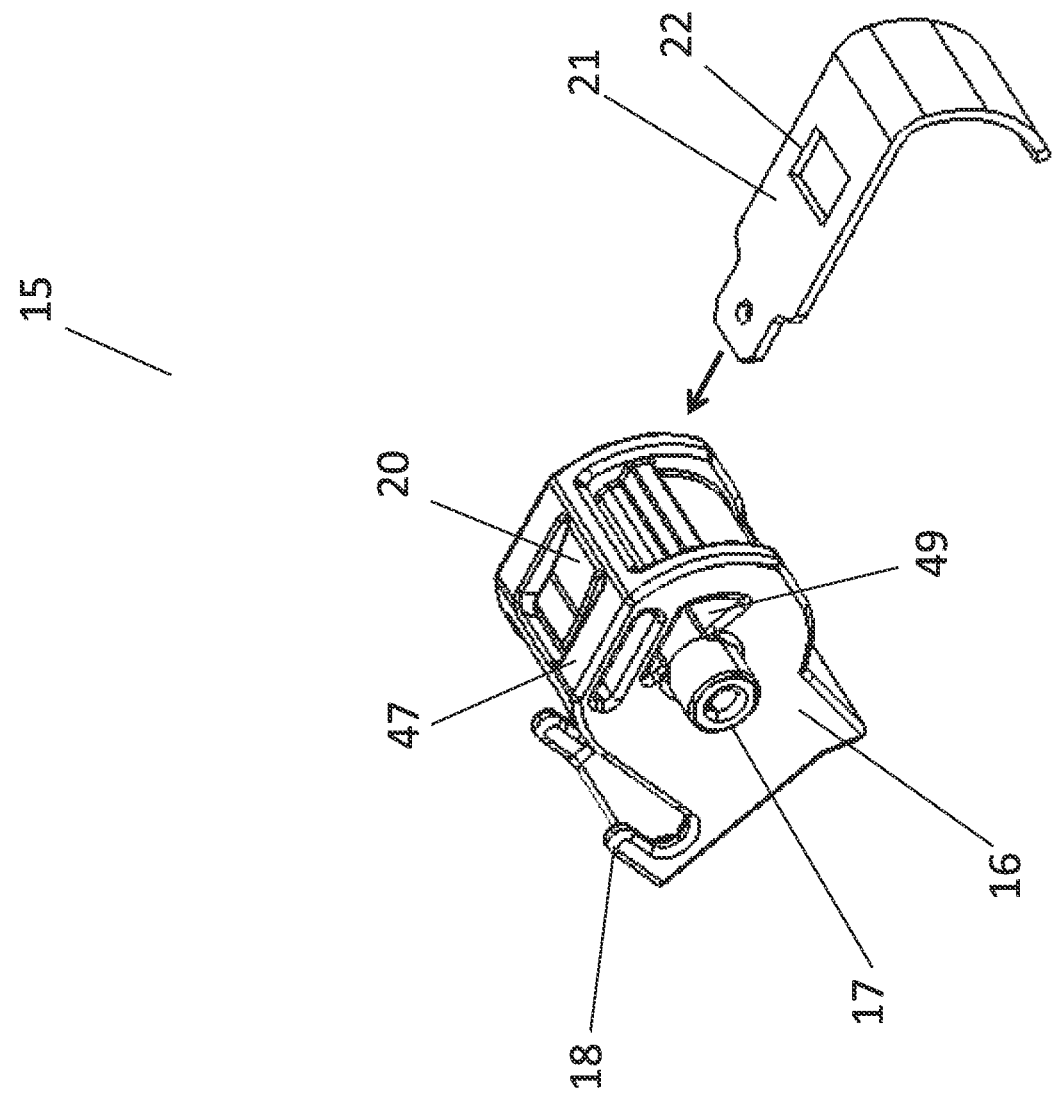
FIG. 15 shows an exploded view of the terminal assembly according to the invention.

FIG. 9 shows the vehicle panel assembly 37 including an interior panel 9, a vehicle power supply 19, and a port panel assembly 3. The interior panel 9 has an access port 50 which is a through hole, and the vehicle power supply 19 is routed thought the access port 50 of the interior vehicle panel 9 and connected to the port panel assembly 3 which is then installed into the interior vehicle panel 9.

FIG. 10 to FIG. 15 each shows the port panel assembly 3 including a port panel 14, terminal assemblies 15, and an elastic band 29'. The terminal assemblies 15 are two terminal assemblies, each including a terminal housing 16, a pivot arm 17 placed in the terminal housing 16, an elastic band retainer 18 formed at one end of the terminal housing 16, a retaining clip 20 formed at another end of the terminal housing 16, and an insert terminal 21 inserted into the terminal housing 16. The terminal housing 16 has a cylindrical portion 45 and a rectangular parallelepiped shape portion 46 integrally formed with each other.

The cylindrical portion 45 includes a flange portion 47 protruding outward along a circumference of the cylindrical portion 45 at one side of the terminal assembly 15, and having a space inside of the flange portion 47 with an opening opened toward an outer surface of the flange portion 47 and slits opened along the circumference of the cylindrical portion 45, the opening and the slits being communicated with the space. The retaining clip 20 is placed in the space through the opening and one end of the retaining clip 20 is fixed to the flange portion 47 to move the retaining clip 20 in the space. The insert terminal 21 includes a plate portion having a retaining feature 22 and an arc portion connected to the plate portion and extending along the circumference of the cylindrical portion 45, and the insert terminal 21 is pressed into the terminal housing 16 through the slits until the retaining clip 20 clicks into the retaining feature 22 of the insert terminal 21 and one portion of the plate portion protrudes from the flange portion 47.

The cylindrical portion 45 further includes a through hole 49 extending in an axis direction of the cylindrical portion 45, and the pivot arm 17 of the terminal assembly 15 is placed in the through hole 49 to protrude both end portions of the pivot arm 17 from the terminal housing 16. The elastic band retainer 18 is two projections, each protruding outward from one side of the rectangular parallelepiped shape portion 46 toward the plate portion of the insert terminal 21 to form an L shape, and the rectangular parallelepiped shape portion 46 includes a terminal surface 52 at the other side opposite to the one side where the elastic band retainers 18 are placed.

The port panel 14 includes a locating pocket 38 protruding apart from the port panel 14 to form a concave shape, and the locating pocket 38 includes a base portion 60 and tapered sides 39 narrowed from the port panel 14 to the base portion 60 to form substantially a truncated square pyramid shape. The locating pocket 38 has a pair of support portions 48, each including two support protrusions apart from each other to form a terminal port 28 between the two support protrusions, and locking ports 23 at both sides of the locating pocket 38 which are through holes communicating an inside and an outside of the locating pocket 38. The two support protrusions of each of the pair of support portions 48 protrude from the base portion 60 of the locating pocket 38 vertically, and each of the two support protrusions includes a tapered portion 26 narrowed from an outer end toward an inner end of the tapered portion 26 and a pivot arm retainer 25 placed at the inner end of the tapered portion 26 and connected to the tapered portion 26.

The pivot arm 17 of the terminal assembly 15 is pressed into the tapper portion 26 from the outer end of the tapered portion 26 at the rear side of the port panel 14 until the pivot arm 17 snaps into the pivot arm retainer 25, and the terminal assemblies 15 are placed in the terminal ports 28 to be opposite to each other. The elastic band 29' is looped over the elastic band retainers 18 of the terminal assemblies 15, and urges the terminal assemblies 15 to pull each other without rotating the terminal assemblies 15.

Figure 16:
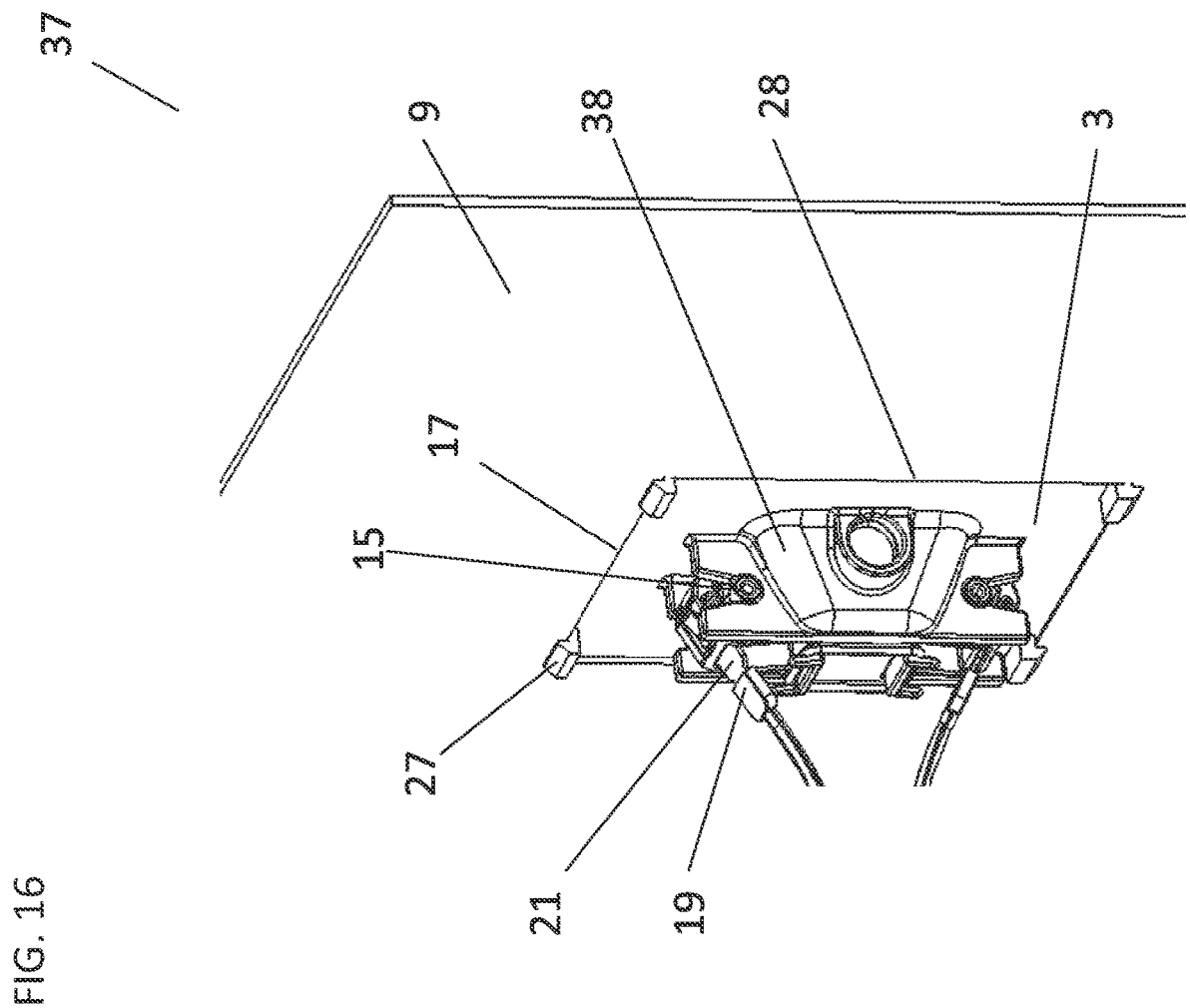
FIG. 16 shows a rear view of the vehicle panel assembly according to the invention.
Figure 17:
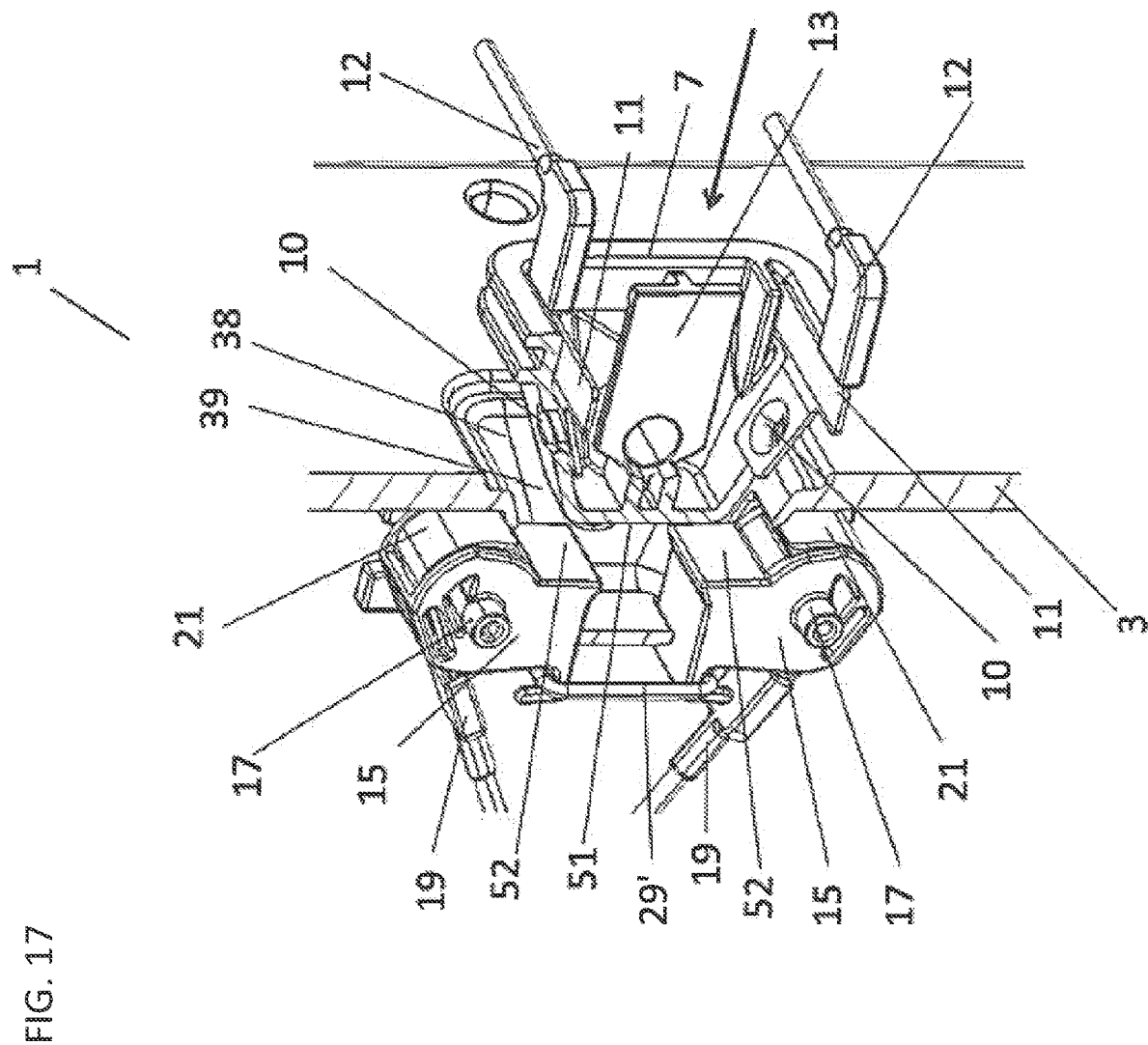
FIG. 17 shows a partly sectional front view of the power transfer system before the terminal assembly is assembled with the panel assembly, according to the invention.
Figure 18:
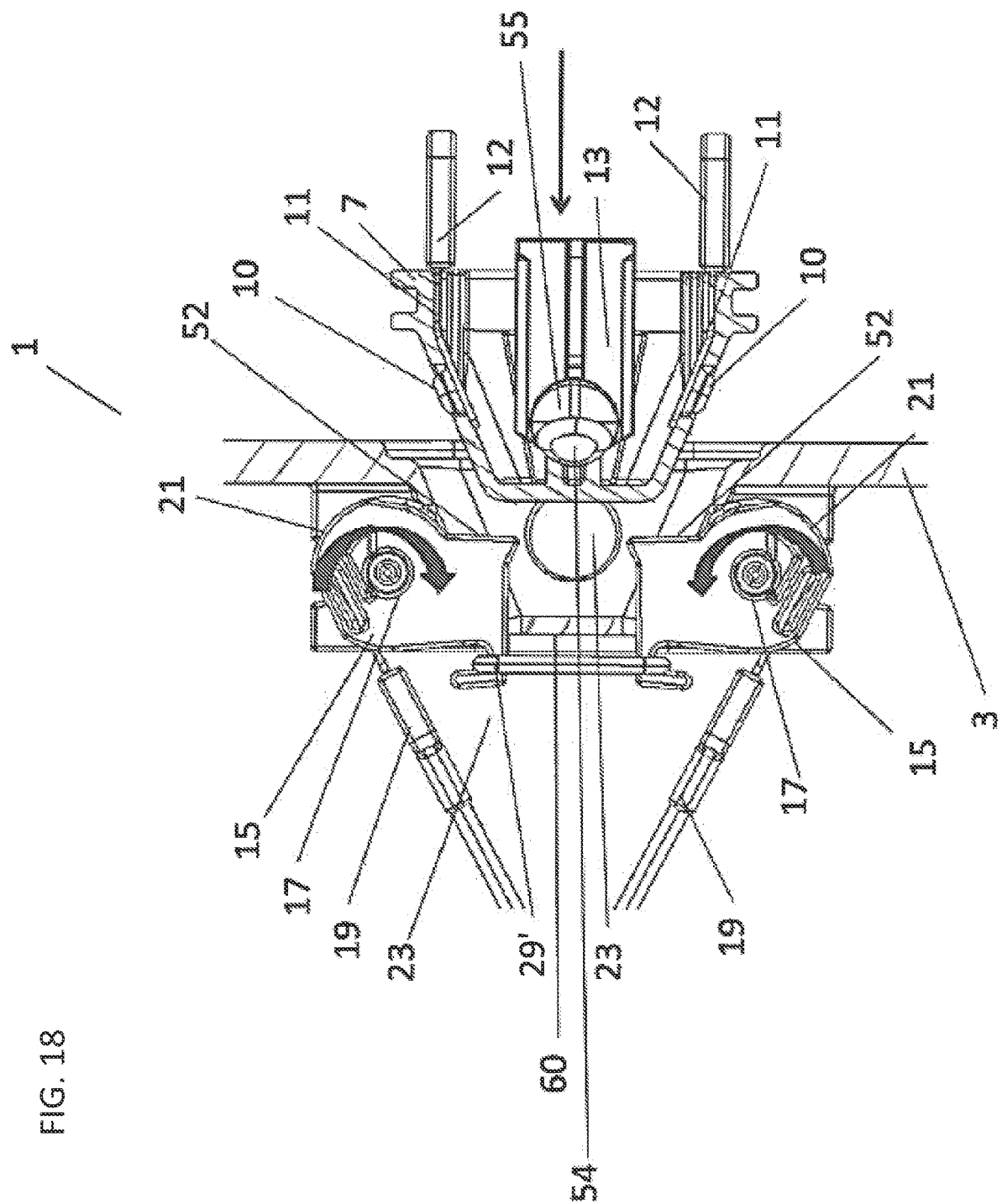
FIG. 18 shows a partly sectional side view of the power transfer system similar to FIG. 17, according to the invention.
Figure 19:
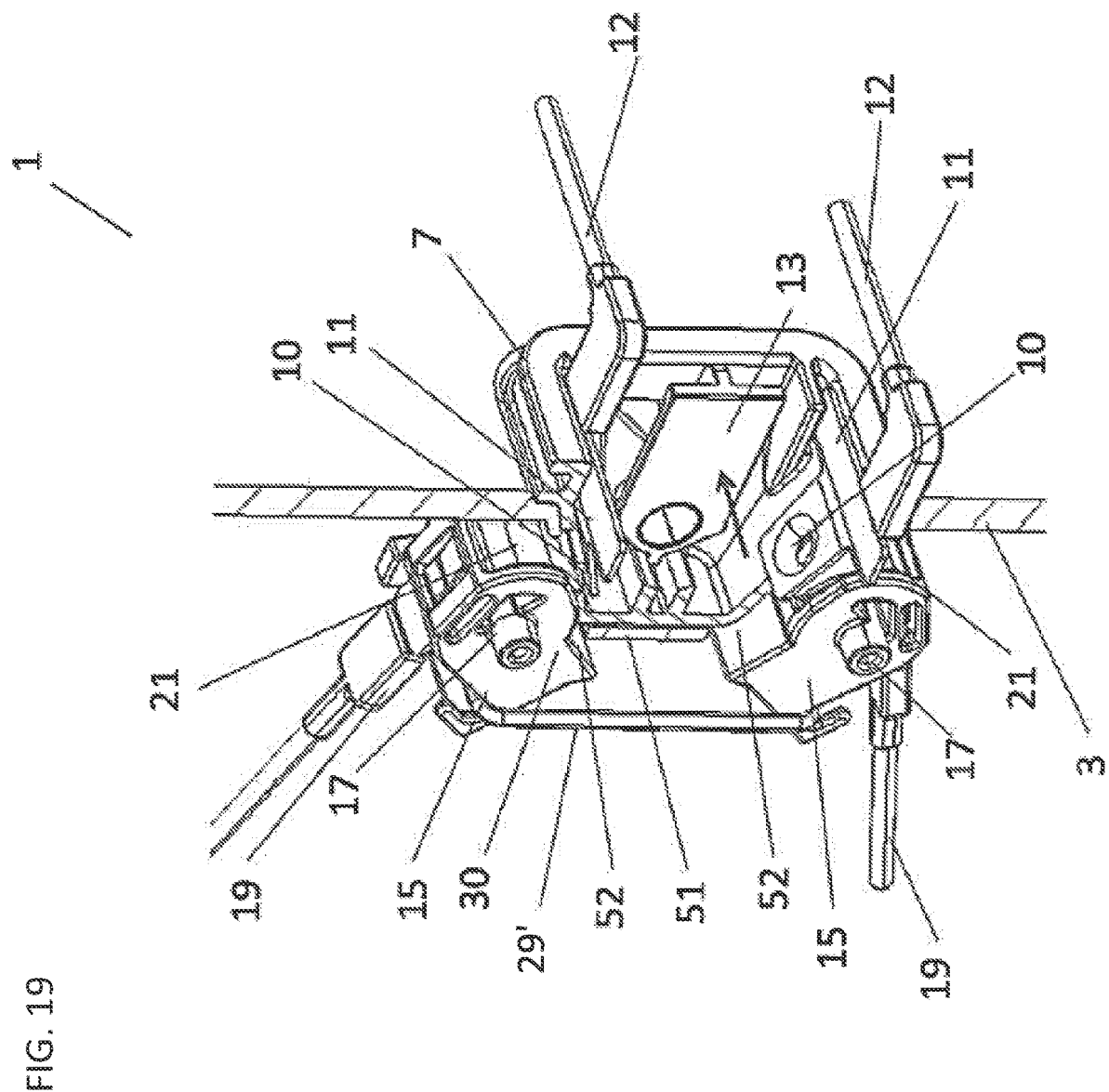
FIG. 19 shows a partly sectional front view of the power transfer system, wherein the terminal assembly is in its engaged position, according to the invention.
Figure 20:
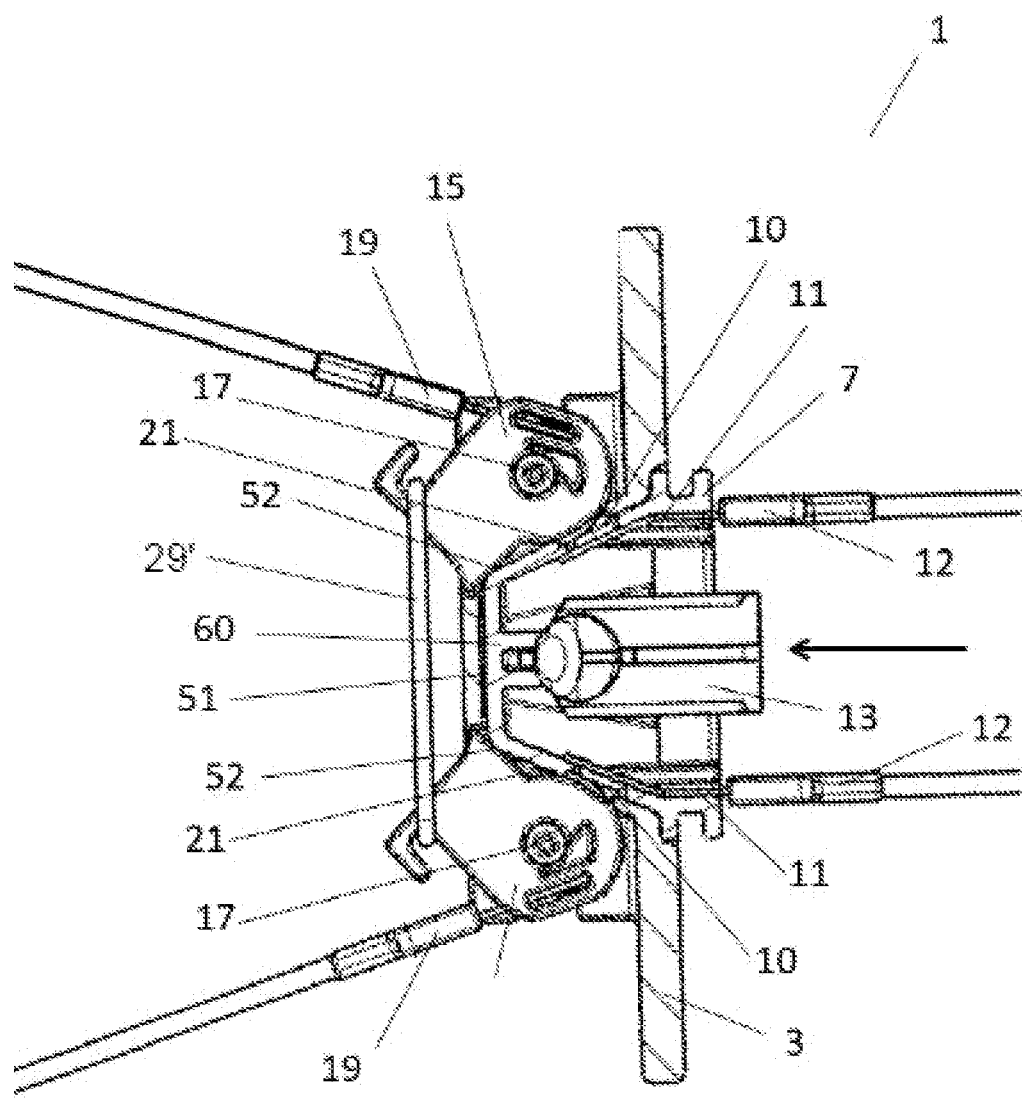
FIG. 20 shows a partly sectional side view of the power transfer system, wherein the terminal assembly is in its engaged position, according to the invention.
Figure 21:
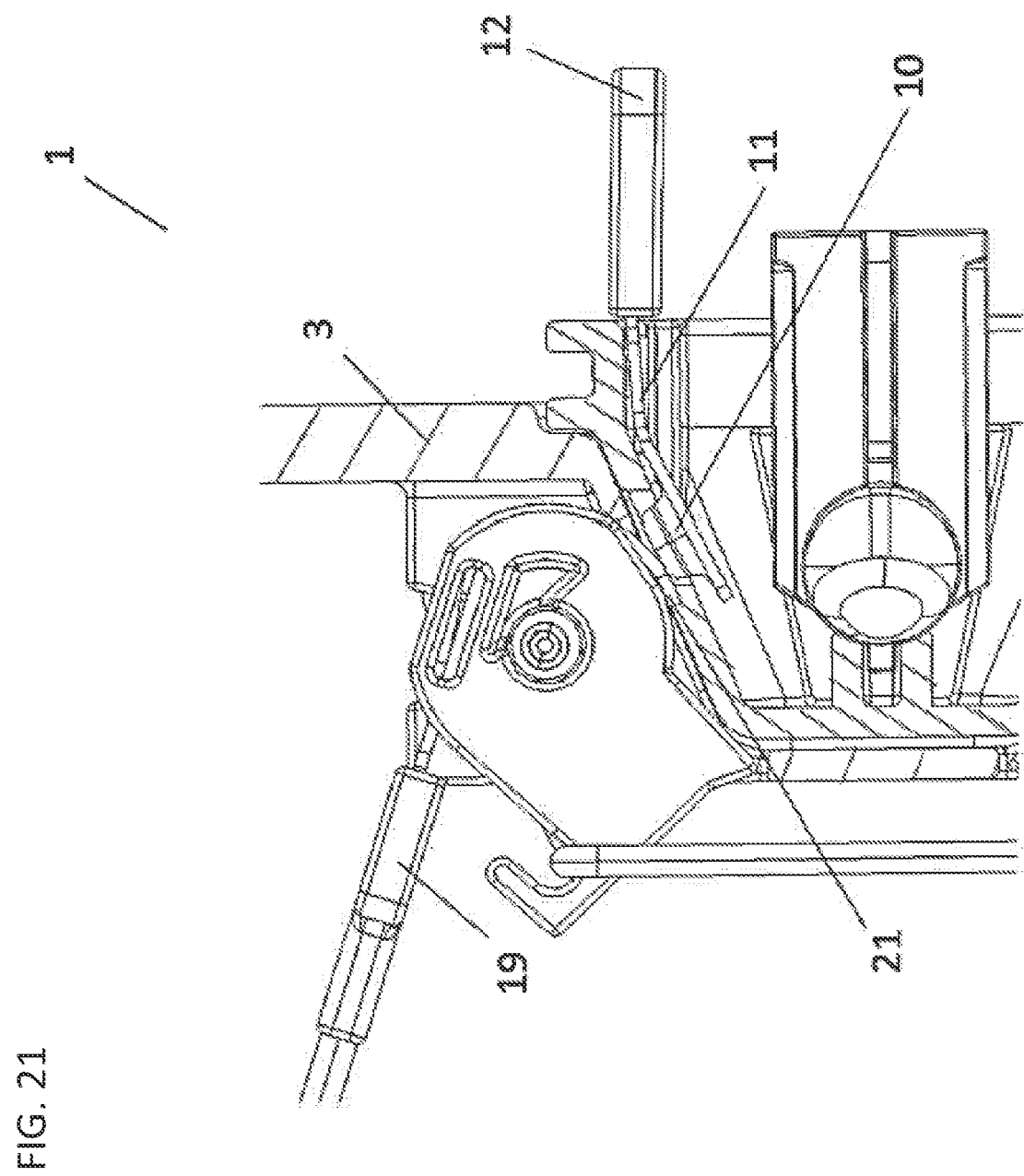
FIG. 21 shows an enlarged partly sectional side view of the power transfer system, wherein the terminal assembly is in its engaged position, according to the invention.

FIG. 16 shows the port panel assembly 3 being installed into the interior vehicle panel 9. The port panel 14 further includes clip features 27 which are four clips, each having a hook portion and located at each corner of the port panel 14 on the rear side of the port panel 14. The port panel assembly 3 is inserted into the access port 50 of the interior vehicle panel 9 after the vehicle power supply 19 has been connected to the plate portion of the insert terminal 21 of the port panel assembly 3, protruding from the flange portion 47, and the port panel assembly 3 is attached to the interior vehicle panel 9 through the clip features 27. The port panel 14 requires additional force during insertion to fit the clip features 27 into the access port 50 when the clip features 27 contact the edges of the access port 50 of the interior panel assembly 9 to snap the port panel assembly 3 into the vehicle panel assembly 37.

FIG. 17 to FIG. 21 show operation and functionality of the power transfer system 1 as the component feature 2 is installed and removed from the vehicle panel assembly 37.

During installation of the component feature 2 into the port panel assembly 3, the power transfer assembly 7 is inserted into the locating pocket 38 of the port panel assembly 3 in the vehicle panel assembly 37. The slide portions 54 of the latch tips 31 of the latches 13 in the power transfer assembly 7 slide along the tapered sides 39 of the locating pocket 38 in the port panel assembly 3 while compressing the compression spring 29 as the latches 13 are forced inside the space of the transfer housing 8. The power transfer assembly 7 moves in the locating pocket 38 until the transfer housing surface 51 of the transfer housing 8 contacts the terminal surfaces 52 of the terminal assembly 15. The pressure pushing the terminal surfaces 52 forces the terminal assemblies 15 to rotate inward around the pivot arms 17, and the elastic band 29' is expanded by the rotation of the terminal assemblies 15.

The terminal assemblies 15 are rotated to contact the insert terminals 21 of the terminal assemblies 15 and the terminal catches 10 of the power transfer assembly 7, and positive power connection is made between the vehicle power supply 19 and the component feature 2 when the insert terminals 21 contact the terminal catches 10. The terminal assemblies 15 are further rotated until the transfer housing surface 51 of the power transfer assembly 7 contacts the base portion 60 of the locating pocket 38. The access ports 32 of the transfer housing 8 and the locking ports 23 of the port panel 14 are aligned to move the latches 13 apart from each other through the compression spring 29, and the latch tips 31 extend out from the access ports 32 of the transfer housing 8 and into the locking ports 23 of the port panel 14. The latch tips 13 inserted into the locking pots 23 lock the component feature 2 in the vehicle panel assembly 37 to prevent the component feature 2 from moving away from the vehicle panel assembly 37, and the vehicle panel assembly 37 retains the component feature 2.

During removal of the component feature 2 from the vehicle panel assembly 37, the power transfer assembly 7 of the component feature 2 is pulled away from the locating pocket 38 of the port panel assembly 3 in the vehicle panel assembly 37. The inclined portions 55 of the latch tips 31 contact edges of the locking ports 23 of the port panel assembly 3 in the installation position, and when the pulling force is applied to the component feature 2, the edges of the locking ports 23 push the inclined portions 55. The pressure pushing the inclined portions 55 is transferred inward through inclined surfaces of the inclined portions 55 to press the compression spring 29, and the latches 13 move approaching to each other, while compressing the compression spring 29 to overcome the urging force of the compression spring 29. The latch tips 31 are pulled out from the locking ports 23 of the port panel 14 to release a lock of the power the component feature 2 and the vehicle panel assembly 37.

As the power transfer assembly 7 of the vehicle panel assembly 37 is pulled out from the locating pocket 38 of the port panel assembly 3, the stored energy in the elastic band 29' of the vehicle panel assembly 37 is released to rotate the terminal assemblies 15 approaching to each other, and the terminal surfaces 52 of the terminal assembly 15 in the port panel assembly 37 push the transfer housing surface 51 of the power transfer assembly 7 in the component feature 2 to move the component feature 2 apart from the port panel assembly 37. The positive power connection between the insert terminal 21 of the terminal assembly 15 and the insert terminal 11 of the power transfer assembly 7 is disconnected, and the terminal surfaces 52 are exposed through the terminal ports 28 of the locating pocket 38 in the port panel assembly 3.

While only selected embodiments have been chosen to illustrate the present invention, it will be apparent to those skilled in the art from this disclosure that various changes and modifications can be made herein departing from the scope of the disclosure as defined in the appending claims. For example, the size, shape, location or orientation of the various components can be changed as needed. It is not necessary for all advantages to be present in a particular embodiment at the same time. Thus, the foregoing descriptions of the embodiments are provided for illustration only, and not for the purpose of limiting as defined by the appended claims and their equivalents.

What is claimed is:

1. A power transfer system comprising:
a port panel assembly including a port panel, a locating pocket formed in the port panel, two locking ports facing each other and arranged in the locating pocket, and two terminal assemblies attached to a rear side of the locating pocket and having conductive terminals, the two terminal assemblies facing each other, and
a power transfer assembly having a transfer housing with access ports and two terminal retainers facing each other, two latches facing each other and housed in the transfer housing to engage the two locking ports, a spring arranged between the two latches and pressing the two latches away from each other to protrude outwardly from the transfer housing through the access ports, and two connection members arranged in the terminal retainers and adapted be connected to an electric device so that when the power transfer assembly is inserted into the port panel assembly, tip portions of the latches are inserted into the locking ports to be secured to the port panel assembly, and the two connection members contact the conductive terminals of the port panel.

2. A power transfer system according to claim 1, wherein each latch includes an inclined portion so that when an external force is applied to the release member, the tip portions of the latches move inwardly and are released from the locking ports and the connection members move away from the conductive terminal.

3. A power transfer system according to claim 1, further comprising the electric device attached to the power transfer assembly and having connection wires connected to the connection members.

4. A power transfer system according to claim 1, wherein the port panel is a panel molded into an interior vehicle panel as a signal member.

5. A power transfer system according to claim 1, further comprising
a vehicle panel assembly including an interior vehicle panel having an access port to which the port panel assembly is attached, and vehicle power supplies connected to the conductive terminals of the port panel assembly,
wherein the port panel assembly includes a plurality of clips securing the port panel assembly to the interior vehicle panel.

6. A power transfer system according to claim 1, wherein the locating pocket has a truncated square pyramid shape so that the two locking ports are formed on two sides of the truncated square pyramid shape and the two terminal assemblies are formed on other two sides of the truncated squared pyramid shape, and the transfer housing has a shape corresponding to and entering the truncated square pyramid shape of the locating pocket so that the two terminal retainers face each other and the two latches face each other on four sides of the truncated square pyramid shape.

7. A power transfer system according to claim 1, wherein each of the terminal assemblies has a pivot arm for rotation, and one conductive terminal so that when the terminal assembly is rotated, the one conductive terminal is located in the terminal retainer to contact one of the connection members.

8. A power transfer system, comprising:
a port panel assembly including a port panel, a locating pocket formed in the port panel, locking ports arranged in the locating pocket, and terminal assemblies attached to a rear side of the locating pocket and having conductive terminals, and
a power transfer assembly having a transfer housing with access ports and terminal retainers, latches housed in the transfer housing to engage the locking ports, a spring arranged between the latches and pressing the latches to protrude outwardly from the transfer housing through the access ports, and connection members arranged in the terminal retainers and adapted be connected to an electric device so that when the power transfer assembly is inserted into the port panel assembly, tip portions of the latches are inserted into the locking ports to be secured to the port panel assembly, and the connection members contact the conductive terminals of the port panel,
wherein the port panel assembly further includes an elastic member arranged between the terminal assemblies to rotate the terminal assemblies in one direction, and
when the power transfer assembly is inserted into the port panel assembly, the terminal assemblies are rotated in a direction opposite to the one direction to contact the conductive terminals with the connection members.

9. A power transfer system according to claim 8, wherein each of the terminal assemblies has a pivot arm for rotation, and one of the conductive terminals so that when the terminal assembly is rotated, the one conductive terminal is located in the terminal retainer to contact one of the connection members.

* * * * *